Dec. 31, 1940.    F. M. SLATER    2,227,278
LUBRICANT DISTRIBUTING DEVICE
Filed April 29, 1939
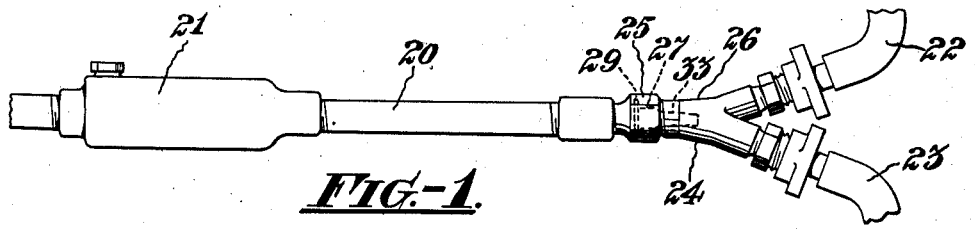
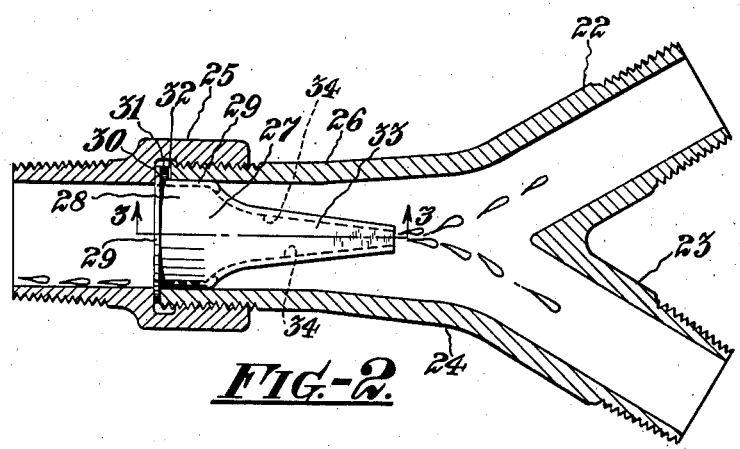
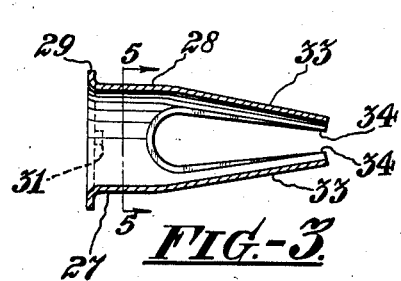     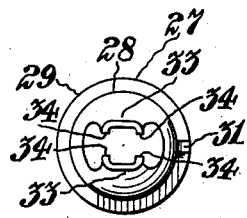
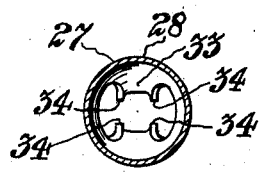
INVENTOR
*Fred M. Slater*
BY
HIS ATTORNEY Patented Dec. 31, 1940

2,227,278

UNITED STATES PATENT OFFICE 2,227,278

LUBRICANT DISTRIBUTING DEVICE

Fred M. Slater, Phillipsburg, N. J., assignor to Ingersoll-Rand Company, Jersey City, N. J., a corporation of New Jersey Application April 29, 1939, Serial No. 270,719

3 Claims. (Cl. 184—55)

This invention relates to distributing devices, and more particularly to a lubricant distributing device for conduits conveying pressure fluid and lubricant to pneumatic tools.

More specifically, the invention is intended for use in connection with pressure fluid supply lines supplying pressure fluid to a plurality of tools and in consequence of which the supply line is provided with branch lines. In arrangements of this character the supply line is usually in the form of a flexible conduit which rests upon the ground and has interposed therein a lubricating device adapted to meter lubricant, as for example oil, into the pressure fluid stream for oiling the tools.

Although the oil is introduced into the pressure fluid in an atomized state it has been found that it is practically impossible to maintain it in suspension. The oil quickly finds its way to the wall of the outermost zone of the air stream and is impelled along the wall of the conduit in the form of a stream by the pressure fluid. In certain arrangements this occurrence is not objectionable, as where the conduit supplies pressure fluid to only one tool since the oil will, in any event, be delivered to the tool and serve its function of lubricating the movable parts.

However, in arrangements in which a multiplicity of tools are being supplied by the main conduit through branch lines it often happens that the conduit assumes a position in the vicinity of the off-takes in which the main conduit lies at a lower elevation than the entrance opening to the branch line and all of the oil then follows the low path and practically none is delivered to the tool connected to the branch line. Consequently, one tool receives too much oil and the other tool only such slight amounts as may remain in suspension in the pressure fluid. These amounts, however, are frequently inadequate to effect the required lubrication and the movable parts of the tool and the surfaces serving as bearings therefor become worn excessively.

It is accordingly an object of the present invention to effect the equable distribution of oil to each one of a plurality of tools deriving their power medium from the same supply conduit.

Other objects will be in part obvious and in part pointed out hereinafter.

In the drawing accompanying this specification and in which similar reference numerals refer to similar parts, Figure 1 is a plan view of a pressure fluid supply conduit having an oil dispensing device therein and being equipped with an oil distributing element constructed in accordance with the practice of the invention, Figure 2 is a plan view, partly in section, of a conduit and an oil distributing device illustrating the manner in which oil is guided from the wall of the conduit and reintroduced into the middle portion of the air stream adjacent the point of divergence of a branch line from the conduit, Figure 3 is a transverse view of the oil distributing device taken through Figure 2 on the line 3—3, Figure 4 is an end view of the oil distributing device, and Figure 5 is a transverse view taken through Figure 3 on the line 5—5.

Referring more particularly to the drawing, 20 designates a supply conduit for conveying pressure fluid to pneumatic tools, as for example rock drills, and 21 an oil dispensing device, of any well known type, interposed in the supply conduit to meter oil into the pressure fluid stream in accordance with the requirements of the tools attached to the conduit.

In the arrangement shown the conduit 20 is provided, for the purpose of illustration, with two branch lines 22 and 23 which are connected to the main conduit 20 by a Y-connection 24 and a nipple 25 threaded to the Y-connection and the conduit 20.

Arranged within the stem 26 of the Y-connection is an oil distributing device 27 which, constructed in accordance with the practice of the invention, comprises a sleeve 28 the outer surface of which may be in slidable engagement with the wall of the stem 26. Thus, any oil flowing along any portion of the wall of the conduit will enter the sleeve 28.

The sleeve is provided at one end with a flange 29 that is pressed firmly against the end of the stem 26 by a shoulder 30 in the nipple 25. A lug 31 on the flange 29 extends into a notch 32 in the end of the stem 26 to prevent rotation of the sleeve 28 with respect to the conduit.

At the opposite end of the sleeve 28 are arms 33, two in the present instance, for guiding the oil from the interior of the sleeve toward the middle portion of the air stream flowing through the conduit. In cross section, the arms 33 are of trough-shape. Each arm has flanges 34 along its sides to assist in guiding the oil toward the free ends of the arms, and the flanges 34 are preferably continued along the adjacent portion of the sleeve so that, in effect, one flange 34 extends along a side of each arm and along the adjacent portion of the sleeve 28.

The arms 33 are preferably of decreasing width towards their free ends and are bent toward each other so that oil flowing off of the end of either arm will be delivered approximately in the middle of the pressure fluid stream, and said arms preferably terminate at a point in the stem 26 closely adjacent, or slightly on the down-stream side of, the point of divergence of the streams flowing through the branch lines 22 and 23.

In practice all of the oil flowing along the wall of the conduit passes into the sleeve 28. The oil is then impelled along the inner surface of an arm or of both arms, depending upon the position of the conduit. When it reaches the free ends of the arms it is reintroduced into the middle portion of the pressure fluid stream immediately before the main stream is divided and approximately equal amounts of oil will be supplied to the tools attached to the branch lines.

I claim:

1. A lubricant distributing device, comprising a conduit for conveying pressure fluid and lubricant, a trough-shaped arm in the conduit for conveying lubricant from the wall of the conduit toward the middle portion of the pressure fluid stream flowing through the conduit, and a flange extending longitudinally of the arm to guide oil to the end of the arm.

2. A lubricant distributing device, comprising a conduit for conveying pressure fluid and lubricant and having a branch, a plurality of trough-shaped arms in the conduit converging toward the center thereof to convey oil from the wall of the conduit toward the point of divergence of the branch from the conduit, and flanges extending along the edges of the arms to guide oil to the ends of the arms.

3. A lubricant distributing device, comprising a conduit for conveying pressure fluid and lubricant and having a branch, a sleeve in the conduit, a plurality of trough-shaped arms on the sleeve converging toward the middle of the conduit to deliver oil from the wall of the conduit to the point of divergence of the pressure fluid streams flowing through the conduit and the branch, flanges extending along the edges of the arms to guide oil to the ends of the arms, and means for preventing rotary movement of the sleeve with respect to the conduit.

FRED M. SLATER.